United States Patent [19]
Furlano

[11] 3,905,564
[45] Sept. 16, 1975

[54] HELICOPTER MUFFLER SYSTEM

[76] Inventor: Roland V. Furlano, 10832 Yarmouth, Granada Hills, Calif. 91344

[22] Filed: Apr. 1, 1974

[21] Appl. No.: 456,463

[52] U.S. Cl. .......... 244/17.11; 181/36 R; 181/36 D; 181/72; 244/53
[51] Int. Cl.² .................... B64C 27/00; F01N 7/00
[58] Field of Search .... 181/35 R, 36 D, 36 B, 36 R, 181/40, 72, 33 HB; 244/17.11, 1 R, 53, 1 N, 54; 60/323; 248/5

[56] References Cited
UNITED STATES PATENTS

| | | | |
|---|---|---|---|
| 1,874,406 | 8/1932 | Wright | 181/72 |
| 2,451,285 | 10/1948 | Heath et al. | 181/36 B UX |
| 2,744,706 | 5/1956 | Gerdy | 181/36 D UX |
| 3,276,541 | 10/1966 | Deremer | 181/36 B UX |
| 3,488,723 | 1/1970 | Veazie | 181/40 UX |
| 3,545,414 | 12/1970 | Thompson | 181/36 D X |
| 3,677,364 | 7/1972 | Pawlina | 181/36 R |

OTHER PUBLICATIONS

Davis, D. D. and Czarnecki, K. R. Dynamometer—Stand Investigation of a Group of mufflers, National Advisory Committe for Aeronautics, Technical Note No. 1838, March, 1949, pp. 5 and 45.

*Primary Examiner*—Stephen J. Tomsky
*Assistant Examiner*—John F. Gonzales
*Attorney, Agent, or Firm*—Sanford Astor

[57] ABSTRACT

This invention relates to a system for providing a single muffler for helicopters which normally require two mufflers, comprising a Y shaped tubing adapted to receive the exhaust from each of the existing exhaust tailpipes and combining the exhaust into a single entry into a centrally mounted muffler system.

6 Claims, 4 Drawing Figures

FIG.1

PATENTED SEP 16 1975

3,905,564

HELICOPTER MUFFLER SYSTEM

BACKGROUND OF THE INVENTION

Exhaust systems on existing helicopters have several problems which the industry has been working on to resolve. The first problem is that of vibration. Existing muffler systems constitute two individual mufflers attached to and extending out from the existing exhaust pipes. These mufflers are not mounted to the helicopter itself but simply extend out from the existing tail pipes, and are subject to damage from the vibration of the helicopter itself, to the extent that they often break off.

In addition, there is a noise problem, which is a major probelm with helicopters. The existing individual muffler systems on each tail pipe suffer from extreme noise when the helicopter is in operation.

An additional problem is the back pressure created by the muffler causing reduced engine power.

It is an object of the present invention to provide a securly mounted exhaust system which reduces the problems of both vibration and noise.

It is a further object of the invention to provide a single muffler system for a helicopter which is securly mounted to the helicopter to avoid vibration problems and which provides a reduced noise factor in the operation of the helicopter.

Yet a further object of the invention is to provide a securly mounted muffler system which reduces back pressure in the engine and thus reduce loss of engine power caused by the muffler.

These and other object become more obvious from the following descriptions and drawings in which FIG. 1 is a plan view of the helicopter exhaust muffler system of the present invention.

Figure 1:
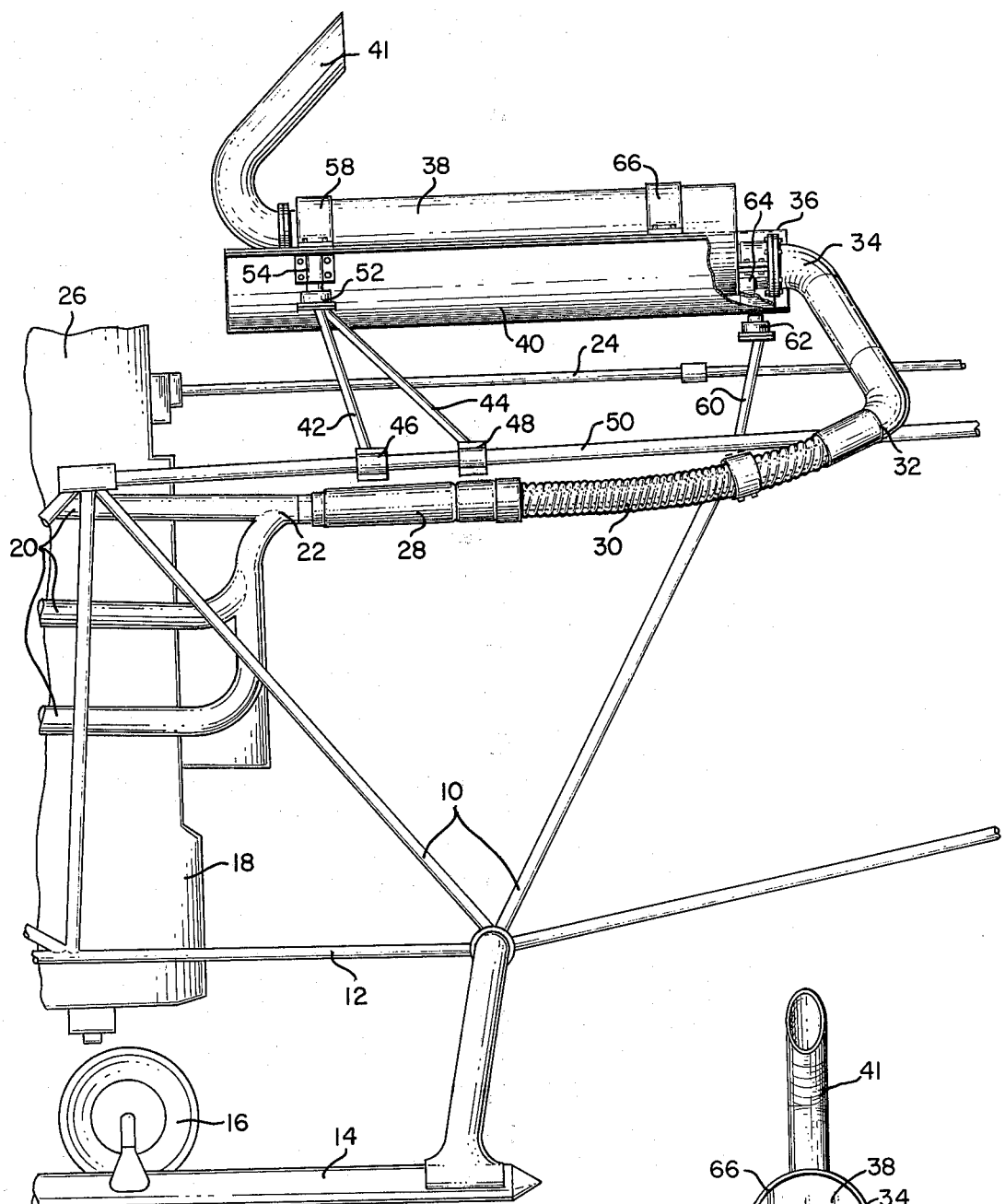

Referring now to FIG. 1 there as shown the rear frame of the helicopter 10 comprising various struts which form a rear frame of the helicopter. Attached to the lower struts 12 is the skid or landing gear 14. Attached to the skid gear 14 is the ground wheel 16 for movement of the helicopter along the ground.

The rear portion of the engine 18 is shown with exhaust outlets 20 leading into a single exhaust pipe 22. Three exhaust outlets are shown since a six cylinder engine three on each side of the helicopter, is the most common type of helicopter engine.

The drive shaft 24 to the rear propeller is shown extending from the transmission 26 of the helicopter.

The device of the present invention is shown comprising a tubing 28 which telescopes over the existing exhaust pipe 22 of the helicopter. Fixedly attached to the telescope portion 28 is a flexible tubing 30 which then leads into one leg of Y shaped tubing 32. FIG. 1 shows one side of the device of the present invention, the opposite side being exactly the same.

The leg 32 of Y shaped tubing leads into the stem 34 of the tubing which leads directly into the inlet 36 of the muffler 38.

The muffler 38 is supported within a fire shield 40 which protects the muffler from the engine of the helicopter. A single exhaust stack 41 provides the exhaust of the gases from the muffler to the atmosphere.

Figure 3:
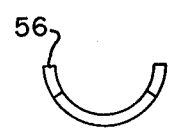
FIG. 3 is a plan view of the muffler.

The muffler 38 and fire shield 40 are fixedly and securely attached to the helicopter by a forward mount consisting of two struts 42, 44 which are fixed by clamps 46, 48 to a horizontal strut 50 of the helicopter frame. The upper ends of struts 42, 44 are attached to a shock mount 52 which is comprised of rubber or other resilient materials in order to give a resilient mounting to the muffler 38. The shock mount 52 is attached to a mounting bracket 54 which is attached to the outside of fire shield 40 and through fire shield 40 to a front supporting mount 56 not visible in FIG. 1 and shown in FIG. 3.

Supporting mount 56 supports muffler 38 and as stated is mounted directly to mounting 54 through fire shield 40. A mounting strap 58 is placed over muffler 38 and fixedly attached to mounting bracket 54 on the inside of fire shield 40 to securely hold muffler 38 in place.

Figure 4:
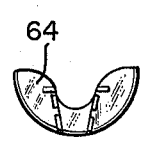
FIG. 4 is a plan view of the rear mount of the muffler.

The muffler is held in the rear by a strut 60 together with another strut not shown in FIG. 1 on the opposite side which are clamped to a rear strut of the frame of the helicopter not visible in FIG. 1. Strut 60 is fixedly attached to a shock mount 62 similar to shock mount 52 which is attached through fire shield 40 to a rear mount 64 shown more clearly in FIG. 4. Rear mount 64 supports the inlet pipe 36 of muffler 38 and thus supports muffler 38. A rear mounting strap or safety strap 66 aids in holding muffler 38 in place and is mounted to fire shield 40 shown more clearly in FIG. 2.

Figure 2:
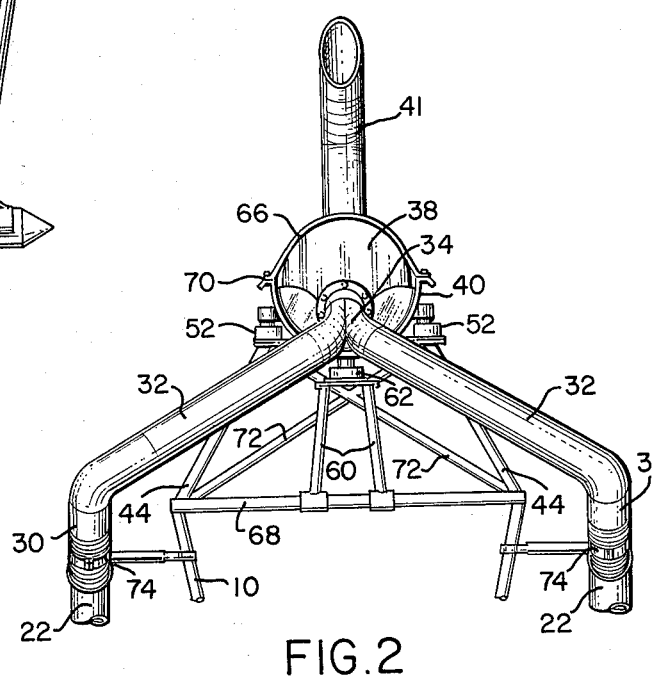
FIG. 2 is a rear view of the exhaust system of the present invention.

Referring now to FIG. 2 there is shown the helicopter frame 10 containing a horizontal rear member 68. The flexible tubing 30 leads from the exhaust 22 into legs 32 of the Y shaped manifold which leads into the inlet 34 into muffler 38. The exhaust stack 41 is shown exiting from muffler 38. Rear support 60 is shown supporting the rear of muffler 38 clamped to horizontal frame strut 68. Rear support 60 is attached to shock mounting 62 which then attaches through fire shield 40 to rear support 64 supporting muffler 38 as described in FIG. 1. Rear strap 66 holds muffler in place and is bolted to the lip 70 of fire shield 40. The side supports 44 are clamped to the helicopter frame as described in FIG. 1 and are attached to flexible mounts 52. Side supports 44 contain cross members 72 to provide further stability to the frame holding the muffler 38. Couplings 74 are placed around flexible tubing 30 and are attached to the helicopter frame 10 in order to give more support to the tubing 30 running from the exhaust 22 to the Y shaped manifold 32.

It has been found in actual operation of the device of applicant's invention that when the Y shaped manifold is of equal length and design a fully tuned exhaust system is created which reduces vibration, back pressure in the engine and noise. Back pressure in the engine from the exhaust system is a common problem in helicopters which causes overheating and loss of power. The existing mufflers and exhaust systems on helicopters that are available today have a back pressure problem. Applicant's exhaust system has been tested and results in a reduction of back pressure to the engine of about 50% and a reduction in total over-all noise of about 43%.

Tests were run in which two identical helicopters were tested, one having the standard muffler and one the muffler system of applicant's invention. Both helicopters were operated at 3200 R.P.M. at an altitude of 615 feet. All six cylinders were fitted with pressure instruments and the following results were obtained.

| | Standard Muffler | Applicant's system |
|---|---|---|
| | Back Pressure | Back Pressure |
| No. 1 Cyl. | 4.4 in Mercury | 2.1 in mercury |
| No. 2 Cyl. | 4.3 | 2.1 |
| No. 3 Cyl. | 4.1 | 1.7 |
| No. 4 Cyl. | 4.2 | 2.1 |
| No. 5 Cyl. | 4.6 | 2.1 |
| No. 6 Cyl. | 4.5 | 2.2 |

In addition, checks were made to determine if the system had any detrimental effects on the engine or transmission and the following results were obtained:

| | | | Standard Mufflers | |
|---|---|---|---|---|
| Test | Outside Temp. °C | Cylinder Head Temp.°C. | Transmission Oil Temp. °C | Manifold Pressure |
| 1 | 29 | 200 | 85 | 20in |
| 2 | 19 | 185 | 74 | 20 |
| 3 | 18 | 190 | 75 | 23 |
| 4 | 13 | 180 | 80 | 22 |
| 5 | 15 | 185 | 80 | 20 |
| 6 | 12 | 195 | 75 | 24 |
| 7 | 14 | 195 | 80 | 23 |
| 8 | 16 | 200 | 90 | 23 |
| 9 | | 195 | 80 | 23 |
| 10 | 15 | 195 | 80 | 25 |
| 11 | | 195 | 85 | 23 |
| 12 | | 185 | 85 | 20 |
| 13 | 16 | 190 | 80 | |

| | | APPLICANT'S SYSTEM | | |
|---|---|---|---|---|
| Test | Outside Temp. °C | Cylinder Head Temp. °C | Trans. Oil Temp. °C | Manifold pressure |
| 1 | 29 | 200 | 90 | 20in |
| 2 | 19 | 185 | 75 | 20 |
| 3 | 18 | 190 | 75 | 23 |
| 4 | 13 | 180 | 80 | 22 |
| 5 | 15 | 175 | 83 | 20 |
| 6 | 12 | 180 | 90 | 24 |
| 7 | 14 | 195 | 75 | 23 |
| 8 | 16 | 195 | 83 | 23 |
| 9 | | 200 | 84 | 21 |
| 10 | 15 | 185 | 75 | 25 |
| 11 | | 185 | 85 | 23 |
| 12 | | 185 | 80 | 20 |
| 13 | 16 | 180 | 70 | |

These tests showed that applicant's system causes no increase in operating temperatures or pressures of the engine and transmission.

The helicopter with applicant's system was given a standard 1200 hour check in which the engine and transmission were completely disassembled. There was no adverse wear.

Having thus described the invention applicant claims:

1. An exhaust system for a helicopter comprising a helicopter having rear frame support struts, flexible tubing leading from the exhaust of the helicopter engine, a Y shaped exhaust manifold adapted to receive said flexible tubing, a single outlet from said Y shaped tubing, a muffler fixedly attached to said outlet, side and rear support struts for securely attaching said muffler to the rear helicopter frame, a fire shield surrounding the lower portion of said muffler for protection from the helicopter engine, and shock mounts for mounting the muffler to the support struts.

2. The device of claim 1 comprising a single exhaust stack leading from said muffler.

3. An exhaust system for a helicopter comprising a helicopter having rear frame support struts, two exhaust pipes leading from the engine of the helicopter, flexible tubing leading from the exhaust pipes of the helicopter, a Y-shaped exhaust manifold adapted to receive said flexible tubing leading to, a single muffler mounted centrally in the frame of the helicopter, a fire shield adapted to protect said muffler from the engine of the helicopter, struts adapted to attach said muffler to said rear helicopter frame, and shock mounts fixidly attached between said struts and said muffler adapted to support said muffler.

4. The device of claim 3 comprising couplings to hold said flexible tubing to the helicopter frame.

5. The device of claim 3 comprising straps adapted to hold said muffler in a downward direction.

6. The device of claim 3 in which said muffler is mounted centrally on the rear helicopter frame over the helicopter drive shaft.

\* \* \* \* \*